(12) United States Patent
Bang et al.

(10) Patent No.: US 12,041,457 B2
(45) Date of Patent: Jul. 16, 2024

(54) GATEWAY APPARATUS FOR RADIO OVER IP NETWORK

(71) Applicant: UNIONPLACE CO., LTD., Seoul (KR)

(72) Inventors: Seongcheol Bang, Seoul (KR); Young Kyu Shin, Seoul (KR)

(73) Assignee: UNIONPLACE CO., LTD., Seoul (KR)

( * ) Notice: Subject to any disclaimer, the term of this patent is extended or adjusted under 35 U.S.C. 154(b) by 406 days.

(21) Appl. No.: 17/337,841

(22) Filed: Jun. 3, 2021

(65) Prior Publication Data

US 2022/0295285 A1    Sep. 15, 2022

(30) Foreign Application Priority Data

Mar. 12, 2021    (KR) .......................... 10-2021-0032521

(51) Int. Cl.
*H04W 12/42*    (2021.01)
*H04M 7/00*    (2006.01)
(Continued)

(52) U.S. Cl.
CPC ......... *H04W 12/42* (2021.01); *H04M 7/0078* (2013.01); *H04W 8/04* (2013.01);
(Continued)

(58) Field of Classification Search
None
See application file for complete search history.

(56) References Cited

U.S. PATENT DOCUMENTS 7,983,228 B1 * 7/2011 Choksi ............... H04L 65/4061
                                                    370/338
10,477,362 B1 * 11/2019 AlNasser ............... H04W 4/08
(Continued)

FOREIGN PATENT DOCUMENTS

EP           4057770 B1      8/2023
JP        2017-527235 A      9/2017
(Continued)

OTHER PUBLICATIONS

No stated author; ETSI TS 123 221 V 5.8.0; 2003; retrieved from the Internet https://www.etsi.org/deliver/etsi_ts/123200_123299/123221/05.08.00_60/ts_123221v050800p.pdf; pp. 1-39, as printed. (Year: 2003).*

(Continued)

*Primary Examiner* — Michael W Chao
(74) *Attorney, Agent, or Firm* — Stein IP LLC

(57) ABSTRACT

A gateway apparatus for a RoIP network includes a secure memory, a first communication interface for transmitting and receiving data to and from terminals in the RoIP network, a second communication interface for transmitting and receiving data to and from a home subscriber server of a mobile communication network, and an operation processor. The operation processor performs (a) obtaining apparatus information, (b) registering the apparatus information in the home subscriber server through the second communication interface, receiving virtual subscriber identity module (SIM) information including a mobile identification number from the home subscriber server through the second communication interface, and storing the received virtual SIM information in the secure memory, and (c) providing, based on the mobile identification number, a service associated with the mobile communication network to at least (Continued)

one terminal among the plurality of the terminals in the RoIP network through the first communication interface.

8 Claims, 4 Drawing Sheets

(51) Int. Cl.
*H04W 8/04* (2009.01)
*H04W 8/18* (2009.01)
*H04W 8/20* (2009.01)
*H04W 88/16* (2009.01)

(52) U.S. Cl.
CPC ............ *H04W 8/183* (2013.01); *H04W 8/20* (2013.01); *H04W 88/16* (2013.01)

(56) References Cited

U.S. PATENT DOCUMENTS

| | | | | |
|---|---|---|---|---|
| 10,681,506 | B1* | 6/2020 | Walker | H04L 65/1063 |
| 10,959,062 | B1* | 3/2021 | Walker | H04W 4/10 |
| 2004/0057405 | A1* | 3/2004 | Black | H04N 7/141 |
| | | | | 370/335 |
| 2004/0120474 | A1* | 6/2004 | Lopponen | H04M 3/42 |
| | | | | 379/88.17 |
| 2005/0190740 | A1* | 9/2005 | Zhao | H04L 65/401 |
| | | | | 370/349 |
| 2007/0014292 | A1* | 1/2007 | Obata | H04L 67/04 |
| | | | | 370/328 |
| 2007/0019656 | A1* | 1/2007 | Martin | H04W 92/02 |
| | | | | 370/401 |
| 2007/0136475 | A1* | 6/2007 | Leppisaari | H04L 65/1069 |
| | | | | 709/227 |
| 2008/0114690 | A1* | 5/2008 | Skidmore | H04L 12/1446 |
| | | | | 705/52 |
| 2009/0164587 | A1* | 6/2009 | Gavita | H04L 61/5069 |
| | | | | 709/204 |
| 2009/0233596 | A1 | 9/2009 | Calabrese | 455/426.1 |
| 2010/0248772 | A1* | 9/2010 | Denman | H04L 65/4061 |
| | | | | 455/518 |
| 2013/0136036 | A1* | 5/2013 | Chen | H04L 47/828 |
| | | | | 370/260 |
| 2015/0065186 | A1* | 3/2015 | Mohd Mohdi | H04W 4/10 |
| | | | | 455/518 |
| 2016/0330595 | A1* | 11/2016 | Hammer | H04W 4/10 |
| 2016/0381629 | A1 | 12/2016 | Yang et al. | H04W 48/18 |
| 2017/0048645 | A1* | 2/2017 | Yerrabommanahalli | |
| | | | | H04L 61/106 |
| 2017/0048682 | A1* | 2/2017 | Chami | H04L 12/189 |
| 2017/0099118 | A1* | 4/2017 | Negalaguli | H04W 4/02 |
| 2018/0146361 | A1* | 5/2018 | Jiang | H04W 4/02 |
| 2018/0248929 | A1* | 8/2018 | Han | H04W 88/02 |
| 2018/0357073 | A1* | 12/2018 | Johnson | H04M 1/72403 |
| 2019/0037401 | A1* | 1/2019 | Egner | H04W 12/61 |
| 2019/0181901 | A1* | 6/2019 | Namiranian | H04L 63/08 |
| 2019/0349743 | A1* | 11/2019 | Hamblet | H04W 8/04 |
| 2019/0372893 | A1* | 12/2019 | Zaslow | H04W 4/021 |
| 2020/0210140 | A1 | 7/2020 | Wilson et al. | G06F 3/165 |
| 2020/0288298 | A1* | 9/2020 | Li | H04W 8/183 |
| 2020/0304973 | A1* | 9/2020 | Yasukawa | H04L 67/565 |
| 2020/0322884 | A1* | 10/2020 | Di Girolamo | H04W 48/18 |
| 2021/0051478 | A1* | 2/2021 | Avula | H04W 12/086 |
| 2021/0185540 | A1* | 6/2021 | Gundavelli | H04W 4/60 |
| 2021/0211862 | A1* | 7/2021 | Chen | H04W 8/183 |
| 2022/0030488 | A1* | 1/2022 | Han | H04L 5/0098 |
| 2022/0086633 | A1* | 3/2022 | Sureshlal | H04W 8/183 |
| 2022/0132315 | A1* | 4/2022 | Kolekar | H04W 12/106 |

FOREIGN PATENT DOCUMENTS

| | | |
|---|---|---|
| JP | 7107605 B1 | 7/2022 |
| KR | 10-0694206 B1 | 3/2007 |
| KR | 10-2017-0035689 A | 3/2017 |
| KR | 10-1716357 B1 | 3/2017 |
| KR | 10-2018-0002262 A | 1/2018 |
| KR | 10-2020-0134914 A | 12/2020 |
| KR | 10-2187556 B1 | 12/2020 |
| KR | 10-2300881 B1 | 9/2021 |

OTHER PUBLICATIONS

First Office Action mailed Jun. 8, 2021, issued to corresponding Korean Application No. 10-2021-0032521.
Request for Preferential Examination mailed Mar. 8, 2021, issued to the corresponding Korean Application No. 10-2021-0032521.
Extended European Search Report dated Nov. 29, 2021, issued to the counterpart European Patent Application No. 21178919.3.

* cited by examiner

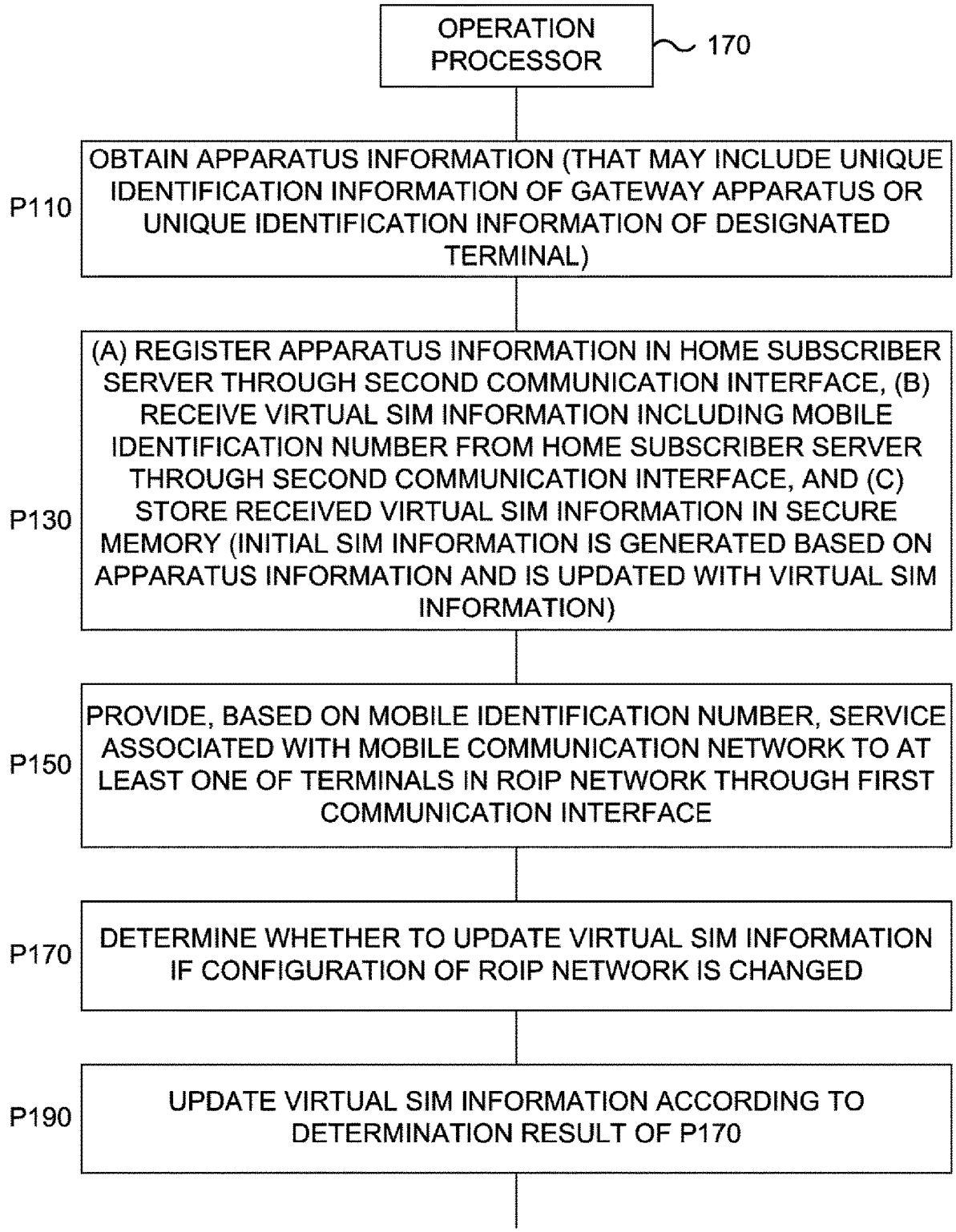

FIG. 4

| | |
|---|---|
| P111 | READ UNIQUE IDENTIFICATION INFORMATION OF GATEWAY APPARATUS STORED IN GATEWAY APPARATUS |
| P113 | RECEIVE UNIQUE IDENTIFICATION INFORMATION FROM DESIGNATED TERMINAL |
| P115 | RECEIVE UNIQUE IDENTIFICATION OF DESIGNATED TERMINAL FROM SERVER IN ROIP NETWORK STORING UNIQUE IDENTIFICATION OF DESIGNATED TERMINAL |

FIG. 5

| | |
|---|---|
| P151 | PROVIDE SERVICE ASSOCIATED WITH MOBILE COMMUNICATION NETWORK TO DESIGNATED TERMINAL IN ROIP NETWORK |
| P153 | PROVIDE SERVICE ASSOCIATED WITH MOBILE COMMUNICATION NETWORK TO TERMINAL GROUP INCLUDING DESIGNATED TERMINAL IN ROIP NETWORK |
| P155 | SELECT ONE OR MORE TERMINALS TO WHICH SERVICE ASSOCIATED WITH MOBILE COMMUNICATION NETWORK IS TO BE PROVIDED AMONG TERMINALS IN ROIP NETWORK (MESSAGE DATA OF MESSAGING SERVICE IS ANALYZED AND ONE OR MORE TERMINALS ARE SELECTED BASED ON PREDETERMINED POLICY) |
| P157 | CONVERT MESSAGE DATA INTO AUDIO SIGNAL AND TRANSMIT AUDIO SIGNAL TO ONE OR MORE TERMINALS THROUGH FIRST COMMUNICATION INTERFACE |

GATEWAY APPARATUS FOR RADIO OVER IP NETWORK

CROSS-REFERENCE TO RELATED PATENT APPLICATION

This non-provisional U.S. patent application claims priority under 35 U.S.C. § 119 of Korean Patent Application No. 10-2021-0032521, filed on Mar. 12, 2021, in the Korean Intellectual Property Office, the entire contents of which are hereby incorporated by reference.

BACKGROUND

1. Field

The present disclosure relates to a gateway apparatus for a radio over IP (hereinafter, also referred to as "RoIP") network, and more specifically, to a gateway apparatus that provides a mobile identification number for a RoIP network or one or more terminals in the RoIP network by using virtual subscriber identity module (SIM) information.

2. Description of the Related Art

A push-to-talk service (hereinafter, also referred to as "PTT") is a communication service that is provided in a "push and talk" manner. The PTT service is available to monitor and control sites such as railways, roads, power plants, transmission and distribution facilities, production facilities and business facilities. For the PTT service, for example, a terminal such as a trunked radio system (TRS) type radio transceiver is mainly used.

Meanwhile, RoIP may be used to interface an existing trunked radio System (TRS) type radio transceiver with an internet protocol (IP)-based terminal such as a session initiation protocol (SIP). The RoIP refers to a technique that converts a radio signal of a radio transceiver into an IP signal or converts an IP signal into a radio signal.

The PTT service using the RoIP has various advantages in that communication coverage of the PTT service is expanded through an IP network, compatibility between different types of terminals is provided, and communication is enabled between terminals in different frequency bands. For example, the PTT service using the RoIP is disclosed in Korean Patent No. 10-2187556 (Patent Document 1), Korean Patent Application Publication No. 10-2018-0002262 (Patent Document 2), and Korean Patent No. 10-1716357 (Patent Document 3).

Hereinafter, a network with which various terminals are interfaced using the RoIP is simply referred to as a "RoIP network." For example, various terminals such as a TRS type radio transceiver, a radio transceiver using an unlicensed frequency, a speaker, a SIP-based terminal, a SIP-based speaker, and a SIP-based CCTV may be connected to the RoIP network.

Meanwhile, the RoIP network is provided independently of a mobile communication network. For example, the RoIP network may include a terminal that is not registered in the mobile communication network. That is, the RoIP network may include a terminal to which a mobile identification number is not assigned. For example, if a radio transceiver in the RoIP network does not support a subscriber identity module (SIM) card, the radio transceiver cannot have the mobile identification number and cannot access the mobile communication network. Accordingly, a service associated with the mobile communication network may not be provided for the terminal in the RoIP network. For example, a messaging service such as a short message service is a service associated with the mobile communication network. If there is a terminal to which the mobile identification number cannot be assigned in the RoIP network or if there is a terminal that does not have a function of performing a signal processing on a message and displaying the message in the RoIP network, such a terminal cannot receive the messaging service.

In the case where the RoIP network is used to monitor and control the site as described above, the PTT service can be provided for the terminal in the RoIP network by differentiating the service receiving target into, for example, a specific terminal, a group of terminals, or all terminals in the RoIP network according to a predetermined policy. For example, the predetermined policy refers to a setting in which the target for which the PTT service is to be provided is changed according to a preset item. For example, the predetermined policy may include a policy (setting) for providing the PTT service for all terminals when data is related to an "emergency" item, a policy for providing the PTT service for a terminal group that is assigned to a fire department in the RoIP network when the data is related to a "fire" item, and a policy for providing the PTT service for a terminal group assigned to a first factory in the RoIP network when the data is related to a "first factory" item.

However, as described above, if the terminal in the RoIP network cannot be assigned the mobile identification number or the terminal in the RoIP network does not have a function of perform the signal processing on a message and displaying the message, the terminal cannot receive the message service. Therefore, it is difficult to provide the messaging service for the terminal in the RoIP network by differentiating the service receiving target into, for example, the specific terminal, the group of terminals, or all terminals in the RoIP network according to the predetermined policy.

RELATED ART

Patent Document 1: Korean Patent No. 10-2187556
Patent Document 2: Korean Patent Application Publication No. 10-2018-0002262
Patent Document 3: Korean Patent No. 10-1716357

SUMMARY

In view of the above, the present disclosure provides a technique capable of providing a mobile identification number for a RoIP network or a terminal in the RoIP network by using virtual SIM information.

Further, the present disclosure provides a technique capable of providing a service associated with a mobile communication network, such as a messaging service, for a RoIP network or a terminal in the RoIP network.

Furthermore, the present disclosure provides a technique capable of providing a service associated with a mobile communication network, such as a messaging service, for a RoIP network or a terminal in the RoIP network by changing a service receiving target according to a predetermined policy.

In accordance with an aspect of the present disclosure, there is provided a gateway apparatus for a Radio over IP (RoIP) network, including: a secure memory; a first communication interface configured to provide an interface that transmits and receives data to and from a plurality of terminals in the RoIP network; a second communication interface configured to provide an interface that transmits and receives data to and from a home subscriber server of a mobile communication network; and an operation processor configured to perform (a) obtaining apparatus information; (b) registering the apparatus information in the home subscriber server through the second communication interface, receiving virtual subscriber identity module (SIM) information including a mobile identification number from the home subscriber server through the second communication interface, and storing the received virtual SIM information in the secure memory; and (c) providing, based on the mobile identification number, a service associated with the mobile communication network to at least one terminal among the plurality of the terminals in the RoIP network through the first communication interface.

BRIEF DESCRIPTION OF THE DRAWINGS

FIG. 3 is a flow chart showing an example of processes performed by an operation processor of the gateway apparatus for the RoIP network according to the embodiment of the technique described in the present disclosure.

FIG. 4 is a flow chart showing an example of a process of obtaining apparatus information that is performed by the operation processor of the gateway apparatus for the RoIP network according to the embodiment of the technique described in the present disclosure.

FIG. 5 is a flow chart showing processes performed by the operation processor of the gateway apparatus for the RoIP network to provide a service associated with a mobile communication network according to the embodiment of the technique described in the present disclosure.

DETAILED DESCRIPTION

Figure 1:
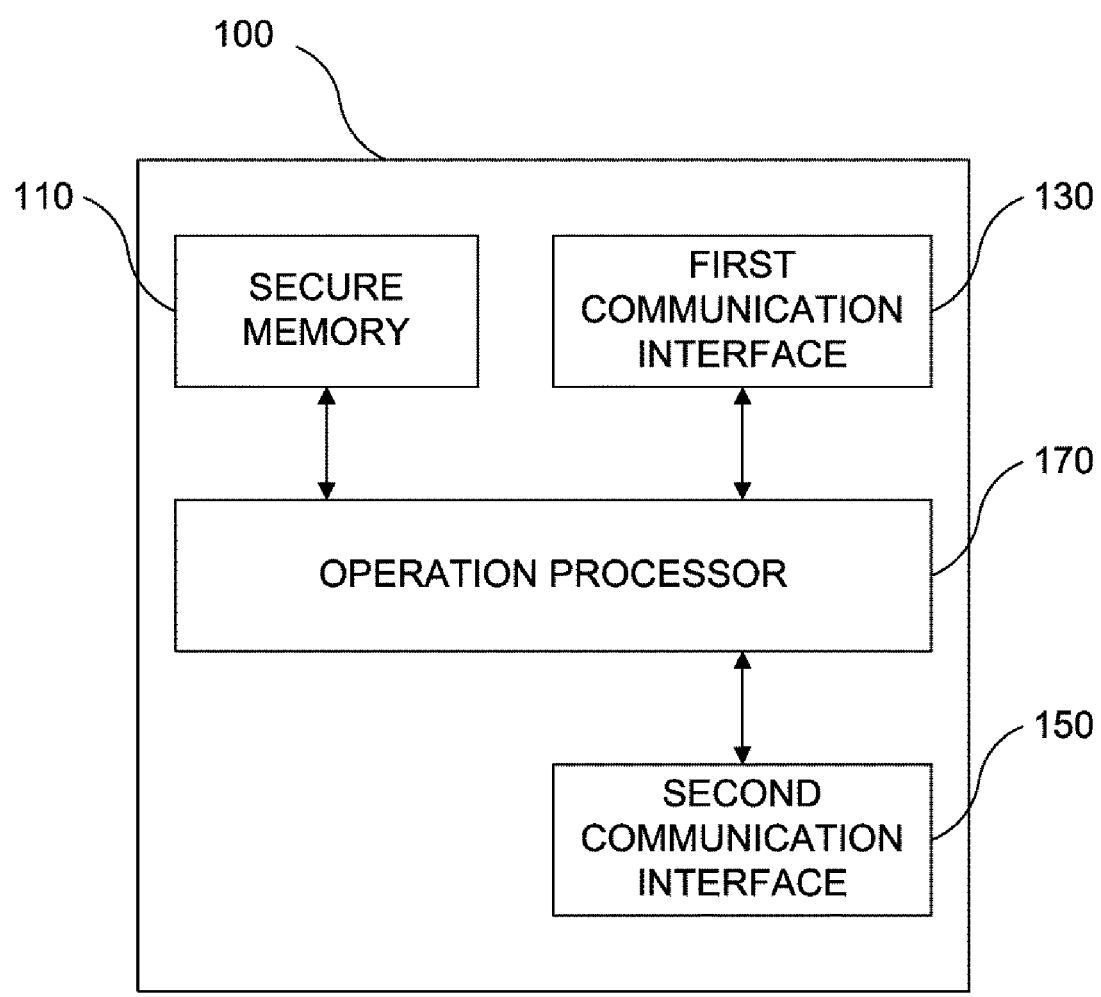
FIG. 1 shows an exemplary configuration of a gateway apparatus for a RoIP network according to an embodiment of a technique described in the present disclosure.

Hereinafter, an embodiment of a gateway apparatus for a RoIP network according to a technique described in the present disclosure will be described in detail with reference to the accompanying drawings. Meanwhile, in the drawings for describing the embodiments of the techniques of the present disclosure, for the sake of convenience of description, only a part of the practical configurations may be illustrated or the practical configurations may be illustrated while a part of the practical configurations is omitted or changed. Further, relative dimensions and proportions of parts therein may be exaggerated or reduced in size.

Embodiment

FIG. 1 shows an exemplary configuration of a gateway apparatus for a RoIP network according to an embodiment of a technique described in the present disclosure.

The gateway apparatus 100 for a RoIP network according to the embodiment of the technique described in the present disclosure may be implemented using a computing device such as a personal computer and a dedicated computer.

Referring to FIG. 1, the gateway apparatus 100 includes a secure memory 110, a first communication interface 130, a second communication interface 150, and an operation processor 170.

The secure memory 110 may be implemented using a semiconductor device disposed in the gateway apparatus 100. For example, the secure memory 110 may be implemented using a semiconductor device such as a processor having a secure zone and a normal zone. The secure zone may also be referred to as a trust zone. Alternatively, the secure memory 110 may be implemented by, for example, a semiconductor device such as a trusted platform module (TPM).

The secure memory 110 may store data therein such that the stored data are protected from being forged or altered. For example, virtual SIM information to be described later is stored in the secure memory 110 under the control of the operation processor 170.

Figure 2:
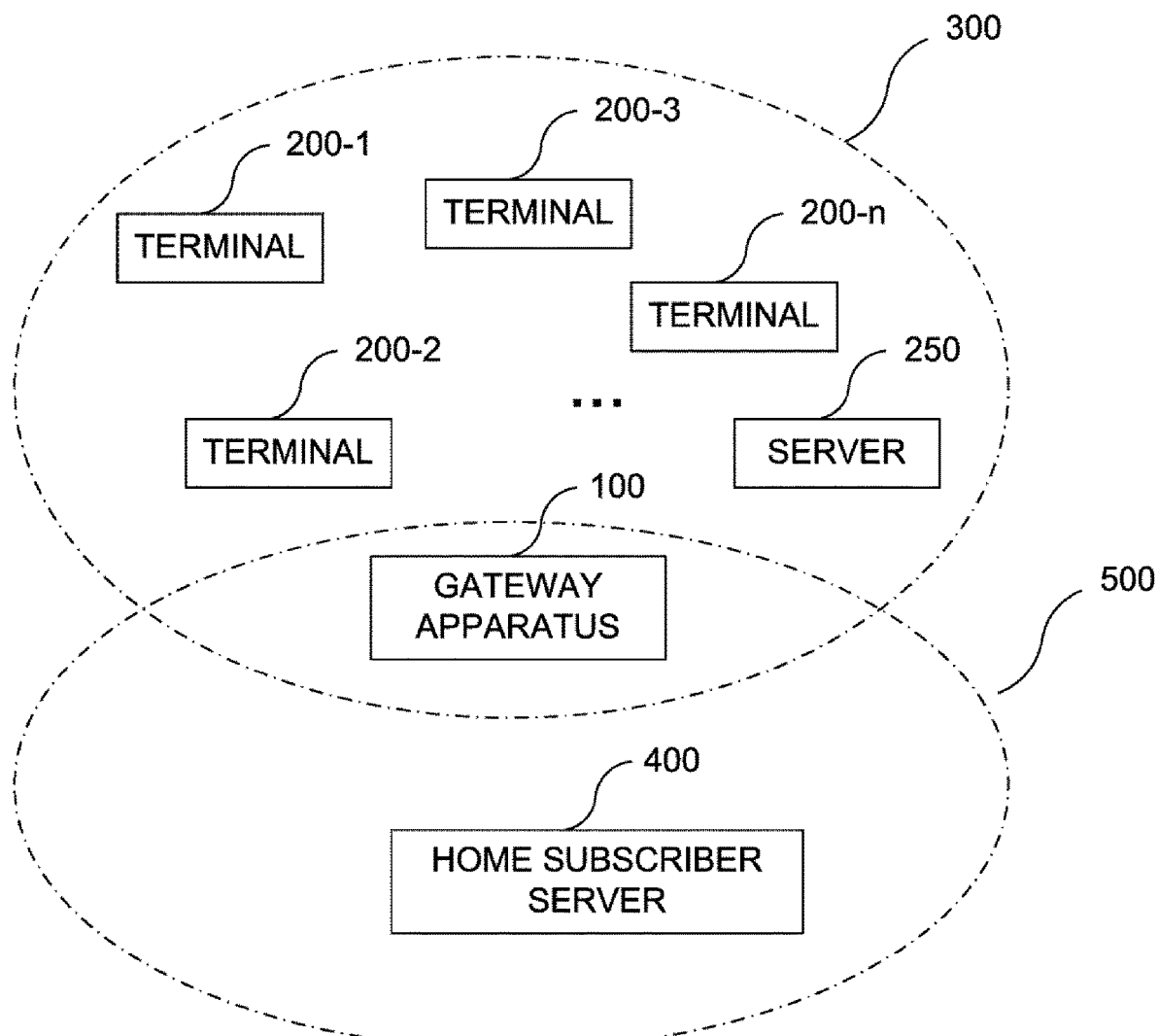
FIG. 2 shows an exemplary network environment where the gateway apparatus for the RoIP network is disposed according to the embodiment of the technique described in the present disclosure.

The first communication interface 130 provides an interface that transmits and receives data to and from a plurality of terminals for example, terminals 200-1 to 200-$n$ shown in FIG. 2 (where n is a natural number of 2 or more), in a RoIP network (300 in FIG. 2). For example, the first communication interface 130 may provide an interface that transmits and receives data to and from the terminals in the RoIP network 300 using SIP and RoIP. That is, the first communication interface 130 may be connected to at least one of the terminals 200-1 to 200-$n$ of FIG. 2 by a wired connection and connected to at least one of the other terminals 200-1 to 200-$n$ of FIG. 2 by a wireless connection.

The first communication interface 130 may be implemented by a semiconductor device such as a communication chip capable of performing wired or wireless communication.

The second communication interface 150 provides an interface that transmits and receives data to and from a home subscriber server (400 in FIG. 2) of a mobile communication network (500 in FIG. 2). The second communication interface 150 may include at least one of a mobile communication data interface and an Ethernet communication interface. Specifically, the gateway apparatus 100 is configured to transmit and receive data to and from the home subscriber server 400 through a wireless communication method using, for example, a mobile communication data interface (e.g., long-term evolution (LTE) or 5G) or through a wired communication method using, for example, an Ethernet communication interface.

The second communication interface 150 may be implemented by a semiconductor device such as a communication chip capable of performing wired communication or wireless communication.

The operation processor 170 is connected to the secure memory 110, the first communication interface 130, and the second communication interface 150. The operation processor 170 is configured to perform processes to be described later according to the embodiment of the technique described in the present disclosure.

The operation processor 170 may be implemented by, for example, a semiconductor device such as a central processing unit (CPU). In a case where the operation processor 170 is implemented using a semiconductor device such as a processor having a secure zone and a normal zone, the secure memory 110 may be implemented using the secure zone of the processor. The operation processor 170 may include one or more processors (not shown). The processors may be configured to respectively perform at least some of the processes to be described later performed by the operation processor 170.

FIG. 2 shows an exemplary network environment where the gateway apparatus for the RoIP network is disposed according to the embodiment of the technique described in the present disclosure.

Referring to FIG. 2, a plurality of terminals, for example, terminals 200-1 to 200-n are located in the RoIP network 300. The gateway apparatus 100 is also located in the RoIP network 300. In addition, a server 250, which is configured to store unique identification information of each terminal, may be located in the RoIP network 300.

A home subscriber server 400 is located in the mobile communication network 500. The gateway apparatus 100 is also located in the mobile communication network 500. Although it is not illustrated in FIG. 2, other apparatuses may be located in the mobile communication network 500 in order to provide a mobile communication service.

Referring to FIG. 2, the gateway apparatus 100 is located in the RoIP network 300 and also located in the mobile communication network 500. Accordingly, as will be described later, the gateway apparatus 100 provides a service associated with the mobile communication network 500 for a plurality of terminals located in the RoIP network 300, for example, at least one of the terminals 200-1 to 200-n. The details thereof will be described later.

The mobile communication network 500 may be a public mobile communication network or a private mobile communication network.

For example, the mobile communication network 500 may be the private mobile communication network if the public mobile communication network does not support virtual SIM information to be described later.

FIG. 3 is a flow chart showing an example of processes performed by the operation processor of the gateway apparatus for the RoIP network according to the embodiment of the technique described in the present disclosure.

Referring to FIG. 3, the operation processor 170 first performs a process P110 of obtaining apparatus information.

The apparatus information is used as information to be registered in the home subscriber server 400 of the mobile communication network 500. The apparatus information includes unique identification information. For example, the apparatus information may include unique identification information of the gateway apparatus 100. In addition, the apparatus information may include unique identification information of a designated terminal among the plurality of terminals, for example, the terminals 200-1 to 200-n.

FIG. 4 is a flow chart showing an example of the process of obtaining the apparatus information that is performed by the operation processor of the gateway apparatus for the RoIP network according to the embodiment of the technique described in the present disclosure.

In the case where the apparatus information includes the unique identification information of the gateway apparatus 100, the process P110 may include a process P111 of reading the unique identification information stored in the gateway apparatus 100.

In the case where the apparatus information includes the unique identification information of a designated terminal among the plurality of terminals, for example, the terminals 200-1 to 200-n, the process P110 may include a process P113 of receiving unique identification information from the designated terminal.

In the case where the apparatus information includes the unique identification information of the designated terminal among the plurality of terminals, for example, the terminals 200-1 to 200-n, the process P110 may include a process P115 of receiving the unique identification of the designated terminal from the server 250 that is located in the RoIP network 300 and stores the unique identification of the designated terminal.

Referring back to FIG. 3, subsequent to the process P110, the operation processor 170 performs a process P130 of (a) registering the apparatus information in the home subscriber server 400 through the second communication interface 150, (b) receiving virtual subscriber identity module (SIM) information including a mobile identification number from the home subscriber server 400 through the second communication interface 150, and (c) storing the received virtual SIM information in the secure memory 110. The virtual SIM information is issued by the home subscriber server 400 and includes information for replacing a physical SIM. The virtual SIM information includes, for example, subscriber identification information (e.g., international mobile subscriber identity: IMSI), a mobile identification number (MIN), a mobile station international ISDN Number, international mobile equipment identity (IMEI), a subscriber key (Ki) for authentication, an authentication key of the operator (OP), and a unique authentication key of the operator (Operator Constant, OPc).

When the home subscriber server 400 issues the virtual SIM information and the operation processor 170 stores the virtual SIM information in the secure memory 110, the gateway apparatus 100 or the designated terminal may be treated as an apparatus registered in the mobile communication network 500.

For example, in the case where the apparatus information includes the unique identification information of the gateway apparatus 100, the gateway apparatus 100 may be treated as an apparatus registered in the mobile communication network 500.

For example, in the case where the apparatus information includes the unique identification information of the designated terminal among the plurality of terminals, the designated terminal may be treated as an apparatus registered in the mobile communication network 500.

The process P130 may include, for example, a process of generating initial SIM information based on the apparatus information obtained from the process P110 and a process of updating the initial SIM information with the virtual SIM information. That is, similar to the issuance of SIM information from the conventional SIM card, the initial SIM information is first stored in the secure memory 110 and the initial SIM information is then updated with the virtual SIM information by using the virtual SIM information received from the home subscriber server 400.

Referring back to FIG. 3, the operation processor 170 further performs a process P150 of providing, based on the mobile identification number, a service associated with the mobile communication network 500 for the plurality of terminals, for example, at least one of the terminals 200-1 to 200-n in the RoIP network 300 through the first communication interface 130.

FIG. 5 is a flow chart showing processes performed by the operation processor of the gateway apparatus for the RoIP network to provide the service associated with the mobile communication network according to the embodiment of the technique described in the present disclosure.

For example, in the case where the apparatus information includes the unique identification information of the designated terminal among the plurality of terminals, the process P150 may include a process P151 of providing the service associated with the mobile communication network 500 to the designated terminal in the RoIP network 300.

In the case where the apparatus information includes the unique identification information of the designated terminal among the plurality of terminals, the designated terminal may be treated as an apparatus registered in the mobile communication network 500.

For example, if the gateway apparatus 100 is connected to the designated terminal in the RoIP network 300 through a communication channel of the first communication interface 130, the service associated with the mobile communication network 500 may be provided to the designated terminal.

Specifically, if the service associated with the mobile communication network 500 is a messaging service or a telephony service and the designated terminal is the terminal 200-1, the gateway apparatus 100 transmits message data or phone call data transmitted thereto over the mobile communication network 500 to the terminal 200-1, so that the service associated with the mobile communication network 500 can be provided to the designated terminal. The message data or the phone call data may be transmitted over an IP network (not shown) instead of the mobile communication network 500. For example, the message data such as message data of a SIP-based messaging service or the phone call data such as phone call data of a VoIP service may be transmitted over the IP network (not shown).

Further, for example, in the case where the apparatus information includes the unique identification information of the designated terminal among the plurality of terminals, the process P150 may include a process P153 of providing the service associated with the mobile communication network 500 for a terminal group including the designated terminal in the RoIP network 300.

For example, if the service associated with the mobile communication network 500 is a messaging service or a telephony service and the designated terminal is the terminal 200-1, the gateway apparatus 100 transmits message data or phone call data transmitted thereto over the mobile communication network 500 to the terminal group including the terminal 200-1, so that the service associated with the mobile communication network 500 can be provided for the terminal group.

For example, if the terminal 200-3 is connected to a communication channel to which the designated terminal 200-1 is connected among a plurality of communication channels of the first communication interface 130, the gateway apparatus 100 transmits message data or phone call data transmitted thereto over the mobile communication network 500 to the terminal group including the terminal 200-1 and the terminal 200-3, so that the service associated with the mobile communication network 500 can be provided to the terminal group.

For example, if the designated terminal 200-1 does not have a function of performing a signal processing on message data and displaying the message data, the terminal 200-1 cannot receive the message service. Accordingly, the process P150 may include a process P157 of converting the message data into an audio signal using, for example, text-to-speech (TTS) and transmitting the audio signal to the terminal group including one or more terminals such as the terminal 200-1 or the terminal 200-1 through the first communication interface 130.

That is, even though a terminal, which does not have a function of performing a signal processing on message data and displaying the message data, is present in the RoIP network 300, the operation processor 170 can provide a messaging service through the process P157.

Further, for example, in the case where the apparatus information includes the unique identification information of the gateway apparatus 100, the process P150 may include a process P155 of selecting one or more terminals among the plurality of terminals in the RoIP network 300 to provide the service associated with the mobile communication network 500 to the selected terminal(s).

In the case where the apparatus information includes the unique identification information of the gateway apparatus 100, the gateway apparatus 100 may be treated as an apparatus registered in the mobile communication network 500.

Therefore, unlike the case where the apparatus information includes the unique identification information of the designated terminal among the plurality of terminals, it is not clear to determine a terminal(s) to which the service associated with the mobile communication network 500 is to be provided among the plurality of terminals in the RoIP network 300.

Therefore, the operation processor 170 selects one or more terminals to which the service associated with the mobile communication network 500 is to be provided through the process P155.

Further, for example, if the service associated with the mobile communication network 500 is a messaging service, in the process P155, message data of the messaging service is analyzed and one or more terminals are selected based on a predetermined policy.

The predetermined policy may include a policy for selecting one or more terminals based on at least one of priority information, disaster information, and location information extracted from the message data.

For example, when a word "emergency" is included in the message data, priority information is set as the highest level, and all terminals in the RoIP network 300 may be selected as the terminals to which the messaging service is to be provided.

For example, when a word "fire" is included in the message data, the disaster information is set as a fire situation, and a terminal group assigned to a fire department among the plurality of terminals in the RoIP network 300 may be selected as the terminal group to which the messaging service is to be provided.

For example, when a word "first factory" is included in the message data, the location information is set as a first factory area, and a terminal group assigned to the first factory among the plurality of terminals in the RoIP network 300 is selected as the terminal group to which the messaging service is to be provided.

Meanwhile, even in the case where the apparatus information includes the unique identification information of the gateway apparatus 100, for example, if the terminal 200-1 does not have a function of performing a signal processing on the message data and displaying the message data, the terminal 200-1 cannot receive the messaging service. Accordingly, even in the case where the apparatus information includes the unique identification information of the gateway apparatus 100, the process P150 includes the process P157 of converting the message data into an audio signal and transmitting the audio signal to one or more terminals through the first communication interface 130.

Referring back to FIG. 3, if the configuration of the RoIP network 300 is changed, the operation processor 170 further performs a process P170 of determining whether to update the virtual SIM information and a process P190 of updating the virtual SIM information according to the determination result of the process P170.

For example, when a terminal is added to or removed from the RoIP network 300 (especially when the aforementioned designated terminal is removed), the operation processor 170 may determine that it is necessary to update the virtual SIM information through the process P170. When updating the virtual SIM information, the operation processor 170 updates the virtual SIM information through the process 190.

In the process 190, the process P110 and the process P130 may be performed, for example.

Other Embodiments

Although the embodiments of the technique described in the present disclosure have been described in detail, the presently disclosed embodiments are considered in all respects to be illustrative and not restrictive. Further, for those of ordinary skill in the art to which the technique described in the present disclosure pertains, the above-described embodiments may be omitted, replaced, or changed in various forms without departing from the scope of the technique described in the present disclosure.

For example, in the above-described embodiments, the case where one virtual SIM information is stored in the secure zone 110, the technique described in the present disclosure is not limited thereto.

For example, a plurality of virtual SIM information such as virtual SIM information of the gateway apparatus 100, virtual SIM information of the terminal 200-1, and virtual SIM information of the terminal 200-3 may be stored in the secure zone 110.

In this case, each of the gateway apparatus 100, the terminal 200-1, and the terminal 200-3 may be treated as an apparatus registered in the mobile communication network 500.

Therefore, for example, the message data of the messaging service transmitted using the mobile identification number of the terminal 200-1 may be provided for the terminal 200-1 or a terminal group including the terminal 200-1, and the message data of the messaging service transmitted using the mobile identification number of the terminal 200-3 may be provided for the terminal 200-3 or a terminal group including the terminal 200-3. Further, for example, the message data of the messaging service transmitted using the mobile identification number of the gateway apparatus 100 may be provided for one or more selected terminals or all terminals in the RoIP network 300.

For example, the technique described in the present disclosure may be applied to a service providing method for the RoIP network.

The service providing method for the RoIP network according to the technique described in the present disclosure is performed by a gateway apparatus including: a secure memory; a first communication interface configured to provide an interface that transmits and receives data to and from a plurality of terminals in the RoIP network; a second communication interface configured to provide an interface that transmits and receives data to and from a home subscriber server of a mobile communication network. The service providing method includes (a) a process of obtaining apparatus information; (b) a process of registering the apparatus information in the home subscriber server through the second communication interface, receiving virtual subscriber identity module (SIM) information including a mobile identification number from the home subscriber server through the second communication interface, and storing the received virtual SIM information in the secure memory; and (c) a process of providing, based on the mobile identification number, a service associated with the mobile communication network for at least one terminal among the plurality of the terminals in the RoIP network through the first communication interface.

Other features of the gateway apparatus for the RoIP network according to the technique described in the present disclosure may also be applied to the service providing method for the RoIP network according to the technique described in the present disclosure.

Accordingly, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

According to the technique described in the present disclosure, it is possible to provide the mobile identification number to the RoIP network or the terminal in the RoIP network by using the virtual SIM information. Therefore, the service associated with the mobile communication network such as the messaging service can be provided to the terminal in the RoIP network. Further, the messaging service can be provided to the terminal in the RoIP network by changing the service receiving target according to the predetermined policy using the result of analyzing a message. In addition, the messaging service can be provided to the terminal in the RoIP network by using text-to-speech (TTS).

What is claimed is:

1. A gateway apparatus for a Radio over IP (RoIP) network, comprising:
   a secure memory;
   a first communication interface configured to provide an interface that transmits and receives data to and from a plurality of terminals in the RoIP network;
   a second communication interface configured to provide an interface that transmits and receives data to and from a home subscriber server of a mobile communication network; and
   an operation processor configured to perform:
   (a) obtaining apparatus information;
   (b) registering the apparatus information in the home subscriber server through the second communication interface, receiving virtual subscriber identity module (SIM) information including a mobile identification number from the home subscriber server through the second communication interface, and storing the received virtual SIM information in the secure memory; and
   (c) providing, based on the mobile identification number, a service associated with the mobile communication network for at least one terminal among the plurality of the terminals in the RoIP network through the first communication interface,
   wherein the apparatus information includes unique identification information of the gateway apparatus, and
   wherein the service is a messaging service, and
   wherein (c) includes (c-1) selecting, among the plurality of terminals in the RoIP network one or more terminals to which the service is to be provided based on one or more words in a message data of the messaging service.

2. The gateway apparatus for the RoIP network of claim 1, wherein (a) includes (a-1) a process of reading the unique identification information of the gateway apparatus stored in the gateway apparatus.

3. The gateway apparatus for the RoIP network of claim 1, wherein (b) includes:
 (b-1) generating initial SIM information based on the apparatus information; and
 (b-2) updating the initial SIM information with the virtual SIM information.

4. The gateway apparatus for the RoIP network of claim 1, wherein the second communication interface includes at least one among a mobile communication data interface and an Ethernet communication interface.

5. The gateway apparatus for the RoIP network of claim 1, wherein (c) includes (c-2) converting message data into an audio signal and transmitting the audio signal to the one or more terminals through the first communication interface.

6. The gateway apparatus for the RoIP network of claim 1, wherein the operation processor further performs:
 (d) determining whether to update the virtual SIM information when a configuration of the RoIP network is changed; and
 (e) updating the virtual SIM information according to a determination result of (d).

7. The gateway apparatus for the RoIP network of claim 1, wherein the secure memory includes at least one among a secure zone and a trusted platform module.

8. The gateway apparatus for the RoIP network of claim 1, wherein a public mobile communication network or a private mobile communication network.

* * * * *